(12) United States Patent
Guha et al.

(10) Patent No.: US 11,755,564 B2
(45) Date of Patent: *Sep. 12, 2023

(54) COMPUTE-EFFICIENT EFFECTIVE TAG DETERMINATION FOR DATA ASSETS

(71) Applicant: Microsoft Technology Licensing, LLC, Redmond, WA (US)

(72) Inventors: Saikat Guha, Seattle, WA (US); Boris Asipov, Bellevue, WA (US); Justin Dellamore, Lynnwood, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/933,297

(22) Filed: Sep. 19, 2022

(65) Prior Publication Data
US 2023/0011065 A1    Jan. 12, 2023

Related U.S. Application Data

(63) Continuation of application No. 16/175,414, filed on Oct. 30, 2018, now Pat. No. 11,481,377.

(51) Int. Cl.
*G06F 16/23* (2019.01)
*G06F 16/14* (2019.01)
*G06F 16/13* (2019.01)
*G06F 16/185* (2019.01)

(52) U.S. Cl.
CPC .......... *G06F 16/2365* (2019.01); *G06F 16/13* (2019.01); *G06F 16/148* (2019.01); *G06F 16/185* (2019.01)

(58) Field of Classification Search
None
See application file for complete search history.

(56) References Cited

U.S. PATENT DOCUMENTS

| 9,767,409 | B1* | 9/2017 | Makhijani | G06F 16/7867 |
| 10,713,235 | B1* | 7/2020 | Shikha | G06F 16/22 |
| 2013/0290323 | A1* | 10/2013 | Saib | G06F 16/113 |
| | | | | 707/E17.014 |
| 2016/0267114 | A1* | 9/2016 | Kamekawa | G06F 16/22 |
| 2018/0121476 | A1* | 5/2018 | Bakke | G06F 16/2379 |

OTHER PUBLICATIONS

"First Examination Report Issued in Indian Patent Application No. 202147019183", dated Jan. 30, 2023, 6 Pages.

* cited by examiner

*Primary Examiner* — Dawaune A Conyers
(74) *Attorney, Agent, or Firm* — Weaver IP L.L.C.

(57) ABSTRACT

Techniques described herein are directed to determining an effective tag for data assets. For instance, each tag associated with a data asset may be associated with certain attributes. Non-limiting examples for such attributes may include a confidence level associated with a source that applied the tag, an applied date at which the tag was applied to the data asset, and/or a hierarchical depth of the data asset to which the tag was applied, as well as additional and/or alternative types of attributes. When a request to determine a tag for a data asset is received, the attributes for all the tags applied to the data asset may be retrieved and/or analyzed to determine which of such tags effectively classifies the data asset. The determined effective tag may be returned to the requesting entity.

20 Claims, 11 Drawing Sheets

| Resource ID | Index |
|---|---|
| Datacenter A/ | 3b0fcf26-d2c3-4e0c-8ed5-45d828029302 |
| Datacenter A/File Server A/ | 92f054f5-237a-4f8d-8756-af32af8bbfcc |
| Datacenter A/File Server A/Folder A/ | e93b10ed-69bf-43f2-b6eb-a30205bebf2d |
| Datacenter A/File Server A/Folder A/Folder A1/ | beb5f714-5b6a-433a-a7d2-a8bee5221a73 |
| Datacenter A/File Server A/Folder A/Folder A1/example_file.doc | 1f0db59a-c9e6-4b4c-ac94-0f025a32befa |

400A

| Index | Tag | Attribute(s) | Tag | Attribute(s) |
|---|---|---|---|---|
| 3b0fcf26-d2c3-4e0c-8ed5-45d828029302 | | | | |
| 92f054f5-237a-4f8d-8756-af32af8bbfcc | | | | |
| e93b10ed-69bf-43f2-b6eb-a30205bebf2d | | | | |
| beb5f714-5b6a-433a-a7d2-a8bee5221a73 | "phone numbers" | Confidence Level: 0.8<br>Date: 10/20/2018<br>Depth: 4<br>Template: No | | |
| 1f0db59a-c9e6-4b4c-ac94-0f025a32befa | "credit card numbers"<br>"negate" | Confidence Level: 1.0<br>Date: 10/22/2018<br>Depth: 5<br>Template: No | "social security numbers" | Confidence Level: 1.0<br>Date: 10/23/2018<br>Depth: 5<br>Template: No |

COMPUTE-EFFICIENT EFFECTIVE TAG DETERMINATION FOR DATA ASSETS

CROSS-REFERENCE TO RELATED APPLICATION(S)

This application is a continuation of U.S. application Ser. No. 16/175,414, filed Oct. 30, 2018, and titled "COMPUTE-EFFICIENT EFFECTIVE TAG DETERMINATION FOR DATA ASSETS," the entirety of which is incorporated by reference herein.

BACKGROUND

Due to the increase of governmental data regulation, such as the General Data Protection Regulation (GDPR), organizations are becoming more diligent about managing and tracking the data they collect. For example, organizations want to know where data is stored, how it is being used, and to whom it is being sent. Classification schemes may be utilized to classify the data being collected. However, effectively classifying such data can be very complex given the amount of data collected and the number of processes that may be classifying such data. This may result in a situation where data is classified with conflicting or inaccurate classifications, thereby rendering such classifications ineffective.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques described herein are directed to determining an effective tag for data assets. For instance, each tag associated with a data asset may be associated with certain attributes. Non-limiting examples for such attributes may include a confidence level associated with a source that applied the tag, an applied date at which the tag was applied to the data asset, and/or a hierarchical depth of the data asset to which the tag was applied, as well as additional and/or alternative types of attributes. When a request to determine a tag for a data asset is received, the attributes for all the tags applied to the data asset may be retrieved and/or analyzed to determine which of such tags effectively classifies the data asset. The determined effective tag may be returned to the requesting entity.

Further features and advantages of the disclosed embodiments, as well as the structure and operation of various embodiments disclosed herein, are described in detail below with reference to the accompanying drawings. It is noted that the disclosed embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 4 depicts example reference tables for associating data assets with tags and tag attributes, according to an example embodiment.

Figure 1:
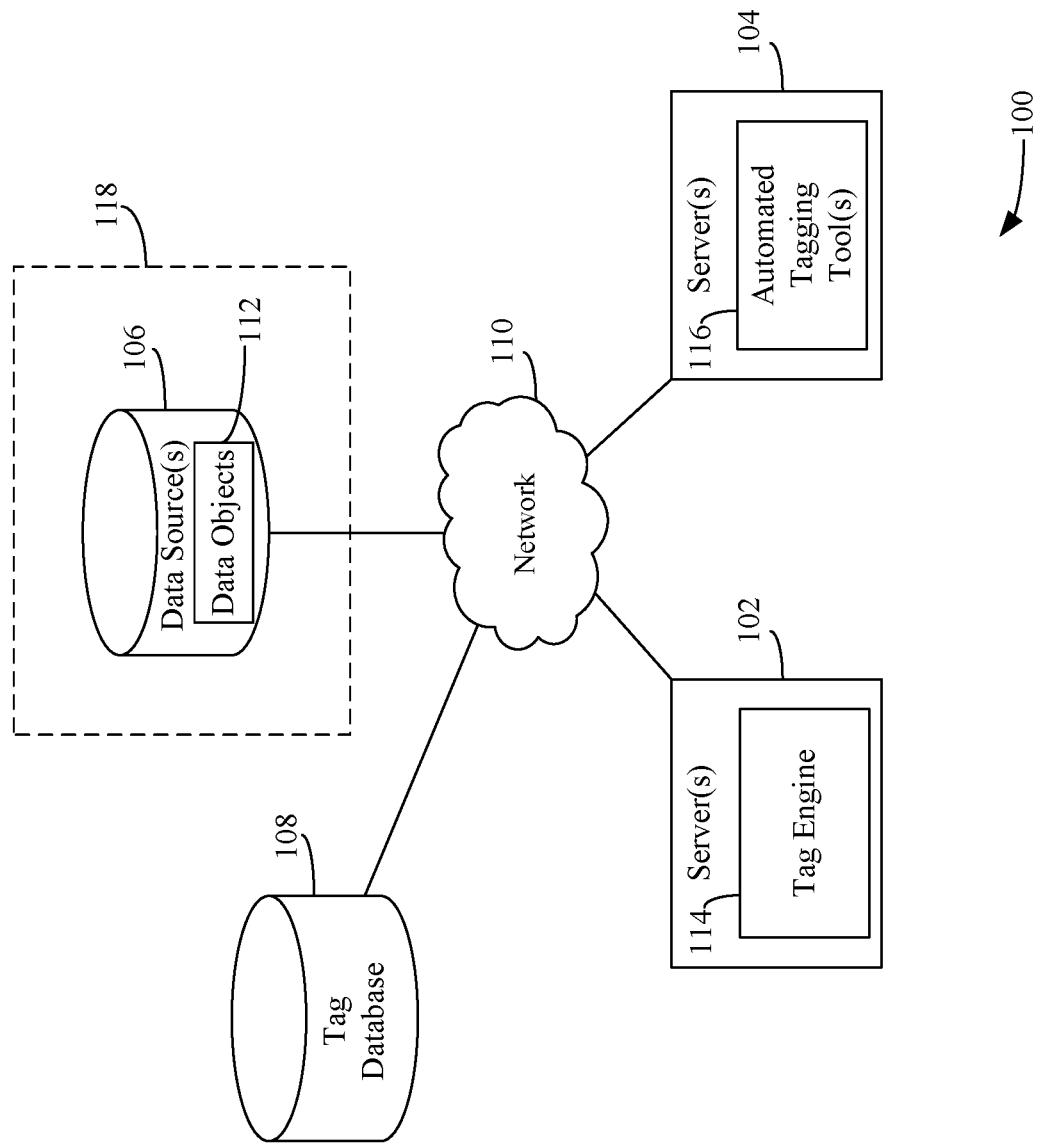
FIG. 1 shows a block diagram of an example system for determining an effective tag for a data asset, according to an example embodiment.

The features and advantages of the present embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features disclosed herein. The scope of the present embodiments is not limited to the description provided herein. The features disclosed herein merely exemplify the disclosed embodiments, and modified versions of the features disclosed herein are also encompassed by the present embodiments. The embodiments described herein are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Effective Tag Determination for Data Sources and Data Objects Data assets, such as data sources and data objects stored therein, may be classified by using descriptive tags. The tags may be applied by a plurality of different sources, such as automated data scanning and tagging tools, manual tagging tags, and many other sources. Thus, any given data asset may be classified via multiple different tags. Often times, these tags can be conflicting or inaccurate, thereby becoming problematic when attempting to determine an effective classification of the data asset.

Techniques described herein are directed to determining an effective tag for data assets. For instance, each tag associated with a data asset may be associated with certain attributes. The attributes may include a confidence level associated with a source that applied the tag, an applied date at which the tag was applied to the data asset, a hierarchical depth of the data asset to which the tag was applied, and/or one or more additional and/or alternative attributes. When a request to determine a tag for a data asset is received, the attributes for all the tags applied to the data asset may be retrieved and/or analyzed to determine which of such tags is a tag that effectively classifies the data asset. The effective tag may be returned to the requesting entity.

The techniques described herein provide several computing efficiencies. For instance, in an embodiment in which data assets are organized hierarchically, a plurality of data assets may be classified using a single tag. For example, when a particular data asset is tagged, the same tag may be applied to data assets that are lower in that data asset's hierarchy (child data assets of the parent data asset). However, the tag is not stored for each of such data assets. Instead, a reference table may store a reference to the tag applied to such data assets. This advantageously reduces the amount of storage required to maintain tags for a plurality of different data assets.

In addition, a request for a tag for a particular data asset may specify the hierarchical path in which the data asset is included. The hierarchical path may specify the data assets that are included in the path. The specified path may be utilized to formulate a single query that requests the tags for each of the specified data assets. Such a technique is significantly faster than conventional schemes that determine an asset's hierarchy (and the assets included therein) by iteratively issuing a number of queries that each determine the hierarchical path one hierarchical level at a time. Accordingly, the techniques described herein advantageously increase the efficiency of the computing device(s) on which such techniques are executing, because the amount of computing resources (e.g., processing, memory, etc.) required to determine all the tags (and attributes thereof) in a data asset's path is significantly reduced.

Moreover, the techniques limit the number of tags that are provided to a user, for example, via a graphical user interface (GUI). In particular, only the determined effective tag is provided to the user, rather than providing every single tag that has been applied to a particular data asset. This advantageously provides a user with a simplified, consistent view of how a data asset is classified. Moreover, by limiting the tags that are rendered to a display screen at any given time, the computational efficiency of the device on which the GUI is rendered is improved and less power is consumed.

Still further, the foregoing techniques may assist services to determine what data is sensitive and where the sensitive data is located in real-time. This information empowers products and services the ability to ascertain where certain data is located, and therefore enables such data to be properly deleted upon request in accordance with certain data regulations, such as GDPR.

FIG. 1 shows a block diagram of an example system 100 for determining an effective data for a data asset, according to an example embodiment. As shown in FIG. 1, system 100 includes one or more first servers 102, one or more second servers 104, a set of data assets 118, and a tag database 108. Each of first server(s) 102, second server(s) 104, data assets 118, and tag database 108 may be communicatively connected to each other via a network 110. Network 110 may comprise one or more networks such as local area networks (LANs), wide area networks (WANs), enterprise networks, the Internet, etc., and may include one or more of wired and/or wireless portions. First server(s) 102, second server(s) 104, data assets 118, and tag database 108 may optionally be included in a cloud platform/architecture (i.e., a cloud-based environment). A cloud platform includes a networked set of computing resources, including servers (e.g., first server(s) 102, second server(s) 104), storage (e.g., one or more data sources 106 and tag database 108), routers, etc., that are configurable, shareable, provide data security, data warehousing services, data cataloging services, etc., and are accessible over a network (e.g., network 110) such as the Internet.

Data assets 118 comprise data source(s) 106, which may comprise one or more file servers, one or more database servers, etc. Each of data source(s) 106 stores one or more data objects 112. Examples of data object(s) include, but are not limited to, a data file, a data folder, a database object (e.g., a table, a directory, etc.), structured data, unstructured data, semi-structured data, a data container, etc. Data source(s) 106 may include any number of data object(s) 112, including numbers in the ones, tens, hundreds, thousands, millions, or even greater numbers of data object(s) 112. Data source(s) 106 and/or data object(s) 112 may be organized hierarchically, where data objects of a file server are organized via a folder/file hierarchy, and where data objects of a database server are organized via a database/table hierarchy.

Figure 2:
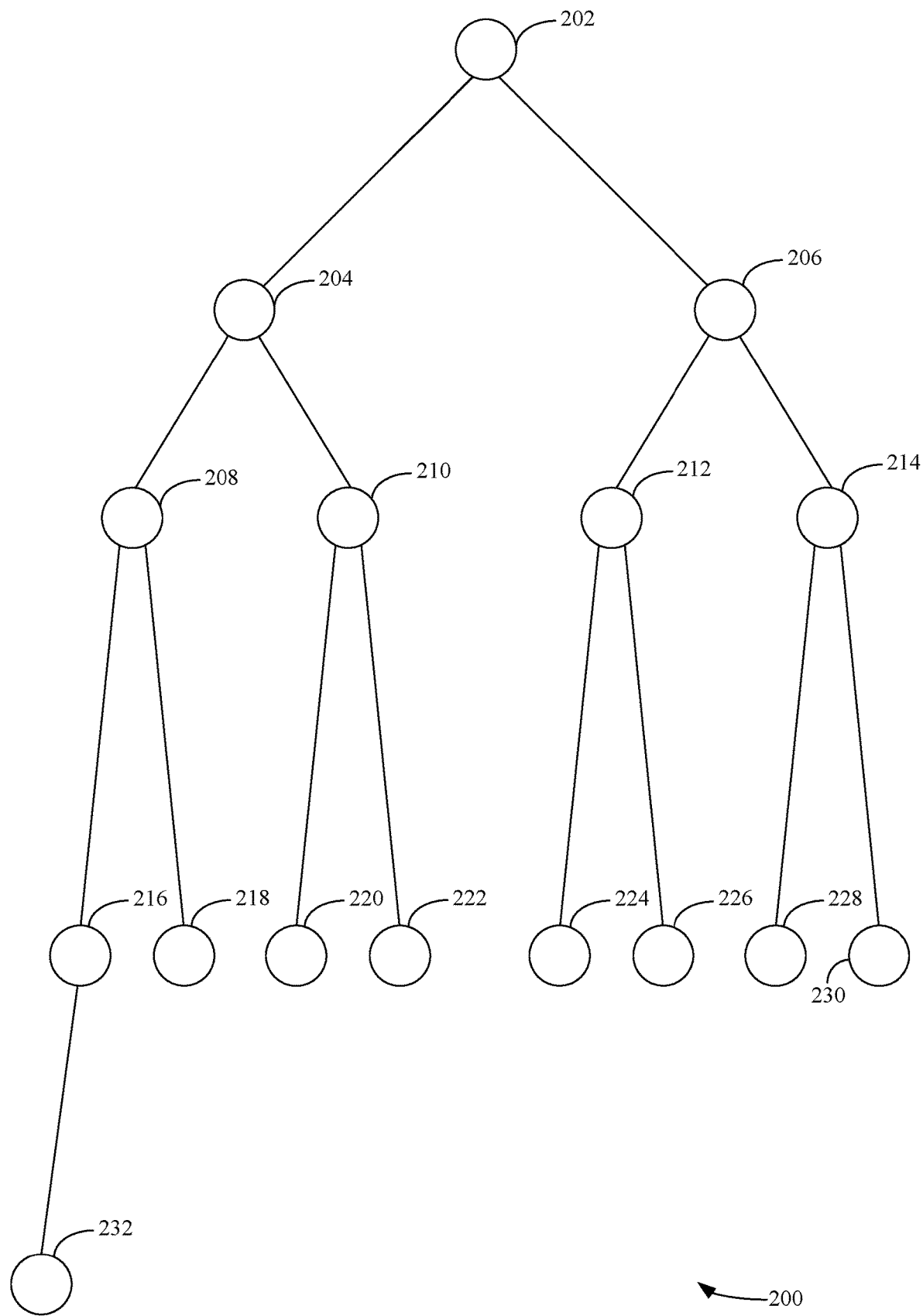
FIG. 2 is an example hierarchical structure in which data assets may be organized, according to an example embodiment.

For example, FIG. 2 is an example hierarchical structure 200 in which data source(s) 106 and data object(s) 112 may be organized, according to an example embodiment. Hierarchical structure 200 comprises a root node 202 and a plurality of child nodes 204, 206, 208, 210, 212, 214, 216, 218, 220, 222, 224, 226, 228, 230, and 232. Root node 202 is a parent to these child nodes, and each child node may be a parent node to the child nodes beneath it. Root node 202 may represent a datacenter comprising a plurality of servers of varying type. For instance, node 204 may represent a file server, and node 206 may represent a database server. Nodes 208 and 210 may each represent a folder maintained by the file server represented by 204. Node 216 may represent a folder within the folder represented by node 208, and node

218 may represent a data file within the folder represented by node 208. Node 232 may represent a data file within the folder represented by node 216. Nodes 220 and 222 may represent data files within the folder represented by node 210. Nodes 212 and 214 may each represent a database maintained by the database server represented by node 206. Nodes 224 and 226 may represent tables within the database represented by node 212, and nodes 228 and 230 may represent tables within the database represented by node 214. It is noted that hierarchical structure 200 is purely exemplary and that data source(s) 106 and data object(s) 112 may be organized based on other structures and/or data source(s) 106 and data object(s) 112 may comprise other types of sources and objects other than described herein.

Referring again in FIG. 1, server(s) 102 may include a tag engine 114. Tag engine 114 may be configured to apply (e.g., associate) a data asset of data assets 118 that is representative of the content included therein. Each of data source(s) 106 and/or data object(s) 112 of data assets 118 may have applied thereto any number of tags from a plurality of different sources. For example, the tags may be determined by one or more automated tagging tools 116. For instance, automated tagging tool(s) 116 may automatically scan a particular data asset of data assets 118 for the contents therein and determine one or more tags classifying the data asset based on its contents. The tags may also be manually determined by a user and may be applied via a graphical use interface provided via an application configured to enable a user to apply tags to the data asset. The determined tags may be provided to tag engine 114, and tag engine 114 may apply the tags. The tags for data assets 118 may be maintained by tag database 108.

The applied tags may be retrieved by tag engine 114. For instance, a user may request the tags for a particular data asset of data assets 118. In response to receiving the request, tag engine 114 may retrieve the tags applied for the particular data asset and provide a response including the tags. The tags may be presented to a user, for example, via a graphical user interface.

Sometimes, the applied tags for a particular data asset may provide conflicting, unreliable or inaccurate information. For instance, a particular data asset may be applied a first tag indicating that the particular data asset comprises credit card numbers, while a second tag applied to the particular data asset indicates that the asset comprises phone numbers. Tag engine 114 may be configured to determine an effective tag representative for the data asset for which the tag was requested based on attributes of the tags applied thereto. The attributes may include a confidence level associated with each of the applied tags, an applied date at which each of the applied tags were applied to the data asset, a hierarchical depth of the data asset to which the tags were associated, an originator of the tags (e.g., the name of an automated tagging tool, a username, etc.), and/or additional or alternative attributes. Given that a data asset may be tagged with any number of tags (e.g., several, tens, hundreds, or even thousands of tags), a user would have difficulty determining the classification of a data asset based on the tags. Automatically providing an effective tag based on attributes of the plurality of applied tags, according to embodiments, advantageously enables the user to quickly and easily determine an effective classification of the data asset. Additional details regarding tag engine 114 are described below.

Figure 3:
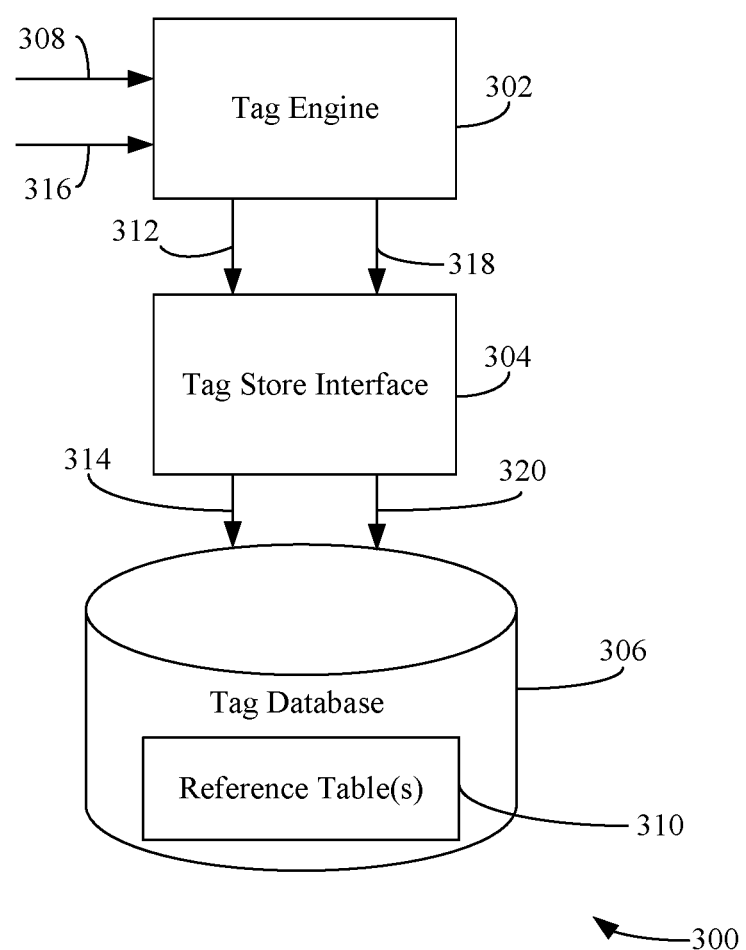
FIG. 3 depicts a block diagram of a system for applying tags to data assets, according to an example embodiment.

For instance, FIG. 3 depicts a system 300 for applying tags to data assets in accordance with an embodiment. As shown in FIG. 3, system 300 includes a tag engine 302, a tag store interface 304, and a tag database 306. Tag engine 302 is an example of tag engine 114, and tag database 306 is an example of tag database 108, as respectively described above with reference to FIG. 1. System 300 is described as follows.

As shown in FIG. 3, tag engine 302 may receive a first request 308 to apply a tag to a data asset. First request 308 may be provided by an automated tagging tool (e.g., automated tagging tool(s) 116, as described above with reference to FIG. 1). First request 308 may include a resource identifier that identifies the data asset and the hierarchical path of the data asset. For instance, with reference to FIG. 2, if the data asset to be tagged is the data file represented by node 232, the identifier may specify the data center represented by node 202, the file server represented by node 204, the folder represented by node 208, the folder represented by node 216, and the data file represented by node 232 (e.g., "Datacenter A/File Server A/Folder A/Folder A1/example_file.doc"). First request 308 may also specify the tag to be applied to the data asset (e.g., "credit card numbers"). First request 308 may further explicitly specify certain attributes of the tag, such as, but not limited to, the originator of the tag.

Tag engine 302 may be further configured to determine certain attributes of the tag. For instance, tag engine 302 may determine a confidence level associated with the tag based on the originator of the tag. In particular, manually-determined tags may be given a higher confidence level than tags determined by automated tagging tools. For instance, manually determined tags may be given a confidence level of 1.0, a first automated tagging tool may be given a confidence level of 0.8, and a second automated tagging tool may be given a confidence level of 0.7, where a confidence level of 0.0 is the lowest confidence level and a confidence level 1.0 is the highest confidence level. Tag engine 302 may also determine the date and/or time at which the tag is applied to the data asset. As described below, the tag may be applied to a data asset by populating a database or other data structure that associates an identifier of the data asset with the tag (and attributes thereof) of the data asset. The date and/or time may correspond to the date and/or time at which the tag is stored and associated with the data asset via the database or other structure. Alternatively, the date and/or time may be specified in first request 308. The hierarchical depth of the data asset to which a tag is applied may be determined based on the number of data assets specified in the hierarchical path. For instance, if the hierarchical path includes 3 data assets, then the hierarchical depth is determined to be 3.

For example, tag engine 302 may populate one or more reference tables 310 that associates an identifier of the data asset with the tag (and attributes thereof). Reference table(s) 310 may be stored in a storage location, such as tag database 306 and is accessible to tag engine 302 via tag store interface 304. Tag store interface 304 is an interface between tag engine 302 and tag database 306. The tags (and attributes thereof) of the data asset may be placed in reference table(s) 310 in association with the resource identifier included in first request 308. For instance, tag engine 302 may provide request 312 to tag store interface 304 that includes the resource identifier, the tag, and its determined attributes, and tag store interface 304 may send a write command 314 (specifying the resource identifier, the tag, and its determined attributes) to tag database 306, which associates the tag and its attributes to the data asset in reference table(s) 310. It is noted that system 300 may utilize any number of tag databases (e.g., tag database 306). In accordance with such an embodiment, tag store interface 304 is an interface to all such tag databases.

As further shown in FIG. 3, tag engine 302 may receive a second request 316 to apply a tag to the same data asset. Second request 316 may be provided via an application that enables a user to manually specify and apply tags. Accordingly, the tag specified by second request 316 is a manually-determined tag. Second request 316 may include a resource identifier that identifies the same data asset and the hierarchical path thereof. Second request 316 may also specify the tag to be applied to the data asset, which may be different than the tag specified by first request 308 (e.g., "social security numbers").

Because second request 316 specifies a manually-determined tag, tag engine 302 may determine that the confidence level associated with the tag is higher than the confidence level determined with the tag specified by first request 308. For instance, tag engine 302 may determine the confidence level for the tag specified by first request 308 to be 0.8 and may determine the confidence level for the tag specified by second request 316 to be 1.0. Tag engine 302 may populate reference table(s) 310 that associates an identifier of the data asset with the tag (and the determined attributes thereof). For instance, tag engine 302 may provide a request 318 to tag store interface 304 that includes the resource identifier, the tag, and its determined attributes, and tag store interface 304 sends a write command 320 (specifying the resource identifier, the tag, and its determined attributes) to tag database 306, which associates the tag and its attributes to the data asset in reference table(s) 310.

In accordance with an embodiment, each tag applied to a particular data asset is maintained by tag database 306. That is, when a subsequent tag is applied to a data asset for which a tag has already been applied, the former tag is not deleted. In accordance with such an embodiment, a "Negate" tag is associated with the former tag. As will be described below, the "Negate" tag enables tag engine 302 to ignore the former tag when determining the effective tag.

In accordance with an embodiment, a tag applied to a data asset is inherited (e.g., is automatically applied) to data asset(s) lower in that data asset's hierarchy. For instance, with reference to FIG. 2, if the folder represented by node 208 (e.g., "Folder A") is applied a tag, folders 216 and 218 and data file 232 are also applied the same tag. For instance, a user may determine that data files in Folder A contain credit card numbers. In this case, the user may apply a tag indicating as such (e.g., "Credit Card Numbers") to Folder A. Tag engine 302 automatically applies the same tag to all data assets included within Folder A via reference table(s) 310. This advantageously enables a plurality of data assets to be classified with a single tag. In accordance with an embodiment, the tag is not stored for each of such data assets. Instead, reference table(s) 310 may store a reference to the tag applied to Folder A. This advantageously reduces the amount of storage required to maintain tag(s) for a plurality of different data assets.

In accordance with an embodiment, tag engine 302 is configured to automatically apply tags for newly-created data assets that match a template pattern specified by a request. For example, a request may specify that all folders or data files having a particular naming convention are to be applied a particular tag. For instance, suppose an organization sorts and organizes credit card numbers used in transactions by month, where credit card numbers used in one month (e.g., January) are stored in a folder labeled "January," credit numbers used in another month (e.g., February) are stored in a folder labeled "February," and so on and so forth. Knowing that other monthly folders will be created as the year continues, a request may specify that all folders labeled with a month are to be tagged with "credit card numbers." The foregoing may be accomplished by specifying a wildcard character (e.g., "#", which, in this example, represents any month) in the resource identifier included in the request (e.g., "Datacenter A/File Server A/Folder A/#/example_file.doc"). In accordance with the request, all data files named example_file.doc located in the path Datacenter A/File Server A/Folder A/#/ (where # represents any month) are tagged with "credit card numbers." In accordance with such an embodiment, tag engine 302 may associate a template attribute with the tag via reference table 310(s), which specifies that the data asset was tagged via a request that included a template pattern. As will be described below, tag engine 302 may utilize the template attribute to determine an effective tag for a particular data asset.

FIG. 4 depicts example reference tables 400A and 400B in accordance with an example embodiment. Reference tables 400A and 400B are examples of reference table(s) 310, as described above with reference to FIG. 3. The tag(s) and attribute(s) that may be associated with a given data asset using an index. The index may be a globally-unique identifier (GUID), or other value, that is based on the resource identifier provided in a request (e.g., first request 308 or second request 316) received by tag engine 302. Table 400A associates the resource identifier with the index, and table 400B associates the index with the tag(s) of the data asset and the attribute(s) of the tag(s).

For instance, when tag engine 302 receives a request to set a tag for a particular data asset, tag engine 302 may generate an index value (e.g., using a hash function) and provides the resource identifier, the index, the tag, and its determined attributes to tag database 306 via tag store interface 304. Tag database 306 associates the resource identifier with the index in reference table 400A and associates the index with the tag and its determined attributes in reference table 400B. As an example, as shown in FIG. 4A, row 402 of reference table 400A associates resource identifier "Datacenter A/" with index "3b0fcf26-d2c3-4e0c-8ed5-45d828029302", row 404 of reference table 400A associates resource identifier "Datacenter A/File Server A/" with index "3b0fcf26-d2c3-4e0c-8ed5-45d828029302," row 406 of reference table 400A associates resource identifier "Datacenter A/File Server A/Folder A/" with index "e93b10ed-69bf-43f2-b6eb-a30205bebf2d," row 408 of reference table 400A associates resource identifier "Datacenter/File Server A/Folder A/Folder A1/" with index "beb5f714-5b6a-433a-a7d2-a8bee5221a73," and row 410 of reference table 400A associates resource identifier "Datacenter A/File Server A/Folder A/Folder A1/example_file.doc" with index "1f0db59a-c9e6-4b4c-ac94-0f025a32befa."

As shown in FIG. 4B, row 418 of reference table 400B associates index "beb5f714-5b6a-433a-a7d2-a8bee5221a73" with the tag "phone numbers" and tag attributes indicating the confidence level of the tag, the date at which the tag was applied, the hierarchical depth of the data asset to which the tag was associated, and whether the tag was applied via a template. Row 420 of reference table 400B associates index "1f0db59a-c9e6-4b4c-ac94-0f025a32befa" with the tags "credit card numbers" and "social security numbers." Column 422 of table 400B specifies the attributes associated with the tag "credit card numbers" and column 424 of table 400B specifies the attributes associated with the tag "social security numbers." As further shown in table 400B, the "credit card numbers" tag is associated with a "negate" tag because the "social security numbers" tag was applied to the corresponding data asset after the "credit card numbers" tag was applied. Rows 412, 414 and 416 of table 400B do not specify any tags and attributes, as no tags have been set for the data assets corresponding to the indices of those rows.

Figure 5:
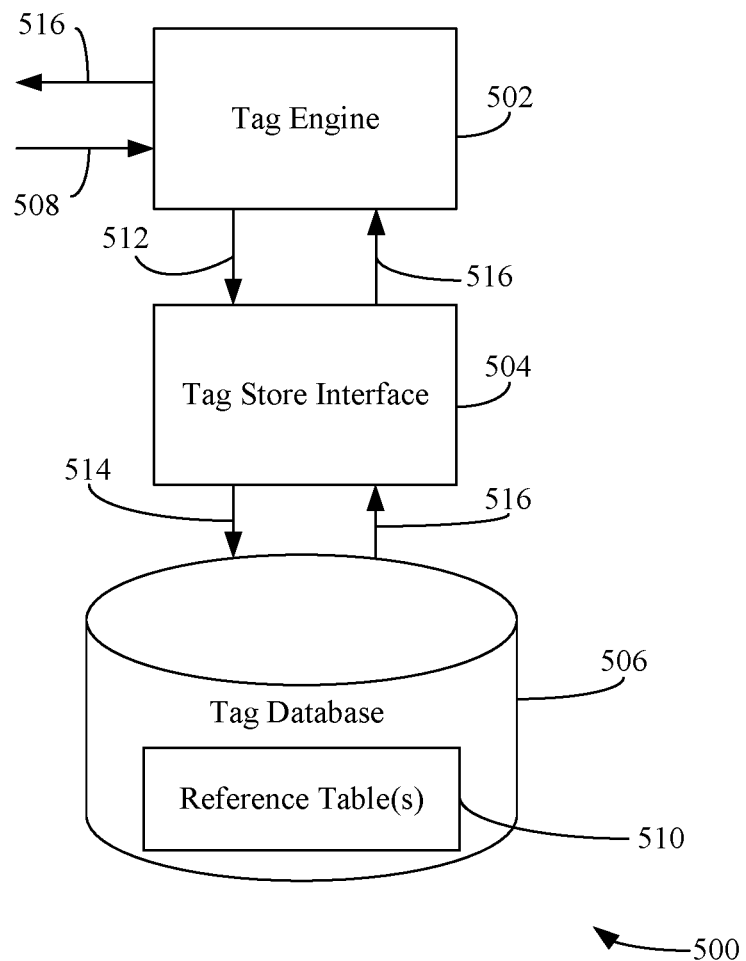
FIG. 5 depicts a block diagram of a system for determining an effective tag of a data asset, according to an example embodiment.

FIG. 5 depicts a system 500 for determining an effective tag for a data asset in accordance with an example embodiment. As shown in FIG. 5, system 500 includes a tag engine 502, a tag store interface 504, and a tag database 506. Tag engine 502 is an example of tag engine 302, tag store interface 504 is an example of tag store interface 304, and tag database 506 is an example of tag database 306, as respectively described above with reference to FIG. 3. Tag database 506 includes one or more reference tables 510, which are examples of reference table(s) 310, as described above with reference to FIG. 3. System 500 is described as follows.

Tag engine 502 may be configured to receive requests for a tag for a particular data asset and determine an effective tag representative of data asset based on the attributes of the tags applied thereto. As described above, the attributes may include a confidence level associated with each the tags, an applied date at which the applied tags were applied to the data asset, a hierarchical depth of the data asset to which the tags were associated, an originator the tags, etc.

As shown in FIG. 5, tag engine 502 receives a request 508 to receive a tag for a particular data asset. First request 508 may include a resource identifier that identifies the data asset and the hierarchical path of data asset. For instance, with reference to table 400A of FIG. 4, if a user wants to receive a tag for example_file.doc, the resourced identifier may specify "Datacenter A/File Server A/Folder A/Folder A1/example_file.doc"). In response to receiving first request 508, tag engine 502 may generate an index (e.g., using a hash function) that is used to search for the tags and attributes thereof of the specified data asset via reference table(s) 510. For example, with reference to FIGS. 4A and 4B, upon receiving first request 508, tag engine 502 may generate an index of "1f0db59a-c9e6-4b4c-ac94-0f025a32befa" based on the resource identifier. Tag engine 502 may provide the resource identifier and/or the index to tag store interface 504 via a request 512. Tag store interface 504 may issue a read command 514 that includes the resource identifier and/or the generated index to tag database 506. Tag database 506 searches for the tag(s) and attribute(s) thereof using the resource identifier and/or index and returns the found tags and attributes thereof to tag store interface 504 via a response 516. Tag store interface 504 forwards response 516 to tag engine 502.

In an embodiment in which the data asset inherits tags from other data assets in its hierarchical path, tag engine 502 may generate an index for each data asset in the data asset's hierarchical path. For example, referring again to FIG. 4A, if a user wants to receive a tag for example_file.doc, tag engine 502 may generate an index for each of "Datacenter A/", "Datacenter A/File Server A/", "Datacenter A/File Server A", "Datacenter A/File Server A/Folder A/Folder A1/", and "Datacenter A/File Server A/Folder A/Folder A1/example_file.doc". Accordingly, tag engine 502 generates the following indices "3b0fcf26-d2c3-4e0c-8ed5-45d828029302," "92f054f5-237a-4f8d-8756-af32af8bbfcc," "e93b10ed-69bf-43f2-b6eb-a30205bebf2d," "beb5f714-5b6a-433a-a 7d2-a8bee5221a73," and "1f0db59a-c9e6-4b4c-ac94-0f025a32befa." In accordance with such an embodiment, a single query including all the generated indices is issued to tag database 506, and tag database 506 returns the corresponding tags and attributes thereof to tag engine 502. The foregoing is achievable due to the resource identifier including the hierarchical path of the data asset. Because the resource identifier identifies each data asset in the data asset's hierarchy, the index associated with data asset can be generated and the associated tags and attributes thereof can be quickly retrieved. Such a technique is significantly faster than conventional schemes that determine an asset's hierarchy by iteratively issuing a number of queries that each determine the hierarchical path one hierarchical level at a time. The techniques described herein advantageously increase the efficiency of the computing device(s) on which tag engine 502 is executing, as the number of queries to be issued is just one. That is, the functioning of the computing device on which tag engine 502 executes is improved, as the amount of computing resources (e.g., processing, memory, etc.) required to determine all the tags and attributes thereof in a data asset's path is significantly reduced.

Upon receiving all the tags and attributes of the data asset, tag engine 502 may determine the effective tag by analyzing the attributes of all the determined tags (both explicitly applied (e.g., manually or by automated tagging tools) and/or inherited tags. For instance, tag engine 502 may first compare the confidence levels for all the determined tags. The tag having the highest confidence level is selected as the effective tag. In the event that more than one of the tags have the highest confidence level, tag engine 502 may then compare the hierarchical depth associated with such tags (i.e., the tags having the highest confidence level). The tag having the deepest hierarchical depth is selected as the effective tag. In the event that more than one tag of such tags have the same, deepest hierarchical level, tag engine 502 may then compare the date at which such tags (i.e., the tags having both the highest confidence level and having the deepest hierarchical level) were applied to their respective data assets. The tag of such tags having the latest date is selected as the effective tag.

For instance, in the example shown in FIG. 4B, when determining an effective tag for data file "example_file.doc", tag engine 502 may determine that the following tags are applied to the data file: "phone numbers", "credit card numbers", "negate", and "social security numbers." To determine the effective tag, tag engine 502 compares the confidence levels associated with the tags to determine the tag having the highest confidence level. In this example, both "credit card numbers" and "social security numbers" have the highest confidence level. However, because "credit card numbers" is associated with a "negate" tag, the "credit card numbers" tag is removed from consideration, thereby leaving "social security numbers" to be selected for the effective tag. It is noted that if the "negate" tag was not present, tag engine 502 would subsequently compare the hierarchical depths of the "credit card numbers" and "social security numbers" tags. In this example, both tags have the same hierarchical depth. As such, tag engine 502 would then compare the dates at which these tags were applied and select the tag having the latest date. In this example, "social security numbers" is associated with the latest date (i.e. "Oct. 23, 2018"), and therefore, would be selected as being the effective tag. As is evident, by utilizing the "Negate" tag, tag engine 502 immediately eliminates tag(s) associated therewith from consideration, and therefore, does not to perform the attribute analysis for that tag, thereby advantageously improving the efficiency of tag engine 502 and/or the computing device on which it executes.

In an embodiment in which tags may be applied using templates, explicitly-applied tags are given priority over template-based tags during effective tag determination. For example, with reference to FIG. 2, suppose a user requests the effective tag for the data file represented by node 220, and a first tag has been applied to the data file via a template. Further suppose the first tag has a confidence level of 80% and has a hierarchical depth of 4. A second, explicit tag has been applied to the folder represented by node 210. The second tag also has a confidence level of 80% and has a hierarchical depth of 3. In this example, the data file also inherits tags from other data assets in the data file's path. Thus, when determining the tags applied to the data file, tag engine 502 determines that the data file is associated with both the first and second tags. In this example, the second, explicit tag is selected as the effective tag, even though it does not have the deepest hierarchical depth. The idea here being that an explicitly-applied tag is more accurate than a template-based tag. It is noted that if the first tag and the second tag had different confidence levels, the tag having the highest confidence level would have been selected as the effective tag.

The foregoing effective tag determination techniques provides several advantages. For example, by associating higher confidence levels with manually-determined tags, manually-determined tags will be chosen over automatically-determined tags in the event that both types of tags are associated with a particular data asset. This is true even in situations where automatically-determined tags are applied to a data asset having a lower depth. For instance, suppose a first data asset located at a first depth is applied with an automatically-determined tag and a second data asset located at a higher, second depth and that is included the first data asset's hierarchical path is applied with a manually-determined tag. In such a case, the effective tag for the first data asset is the manually-determined tag.

Once the effective tag is determined, tag engine 502 may provide a request 516 that specifies the effective tag (e.g., to an entity that requested the effective tag). Request 516 may be provided to an application configured to display the effective tag via a graphical user interface. Such a GUI advantageously provides a user with a simplified, consistent view of how a data asset is classified, rather than bombarding a user with a plurality of tags (some being inaccurate), thereby leaving the user to guess the actual classification of a data asset. Moreover, by limiting the tags that are rendered to a display screen at any given time, the computational efficiency of the device on which the GUI is rendered is improved and less power is consumed.

It is noted, however, that in certain embodiments, tag engine 502 may be configured to receive a request for all tag(s) associated with a particular data asset and provide a response that includes all the tag(s). In this way, if a user wants to be made aware of every single tag applied to a particular data asset, the user has the option to do so.

Figure 6:
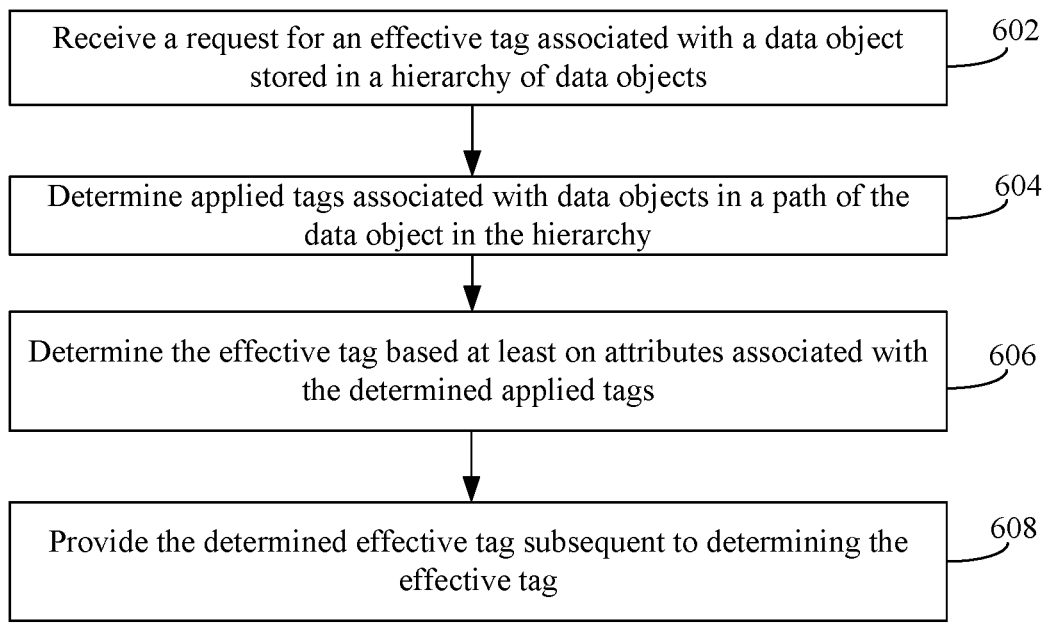
FIG. 6 depicts a flowchart for determining an effective tag for a data asset, according to an example embodiment.
Figure 7:
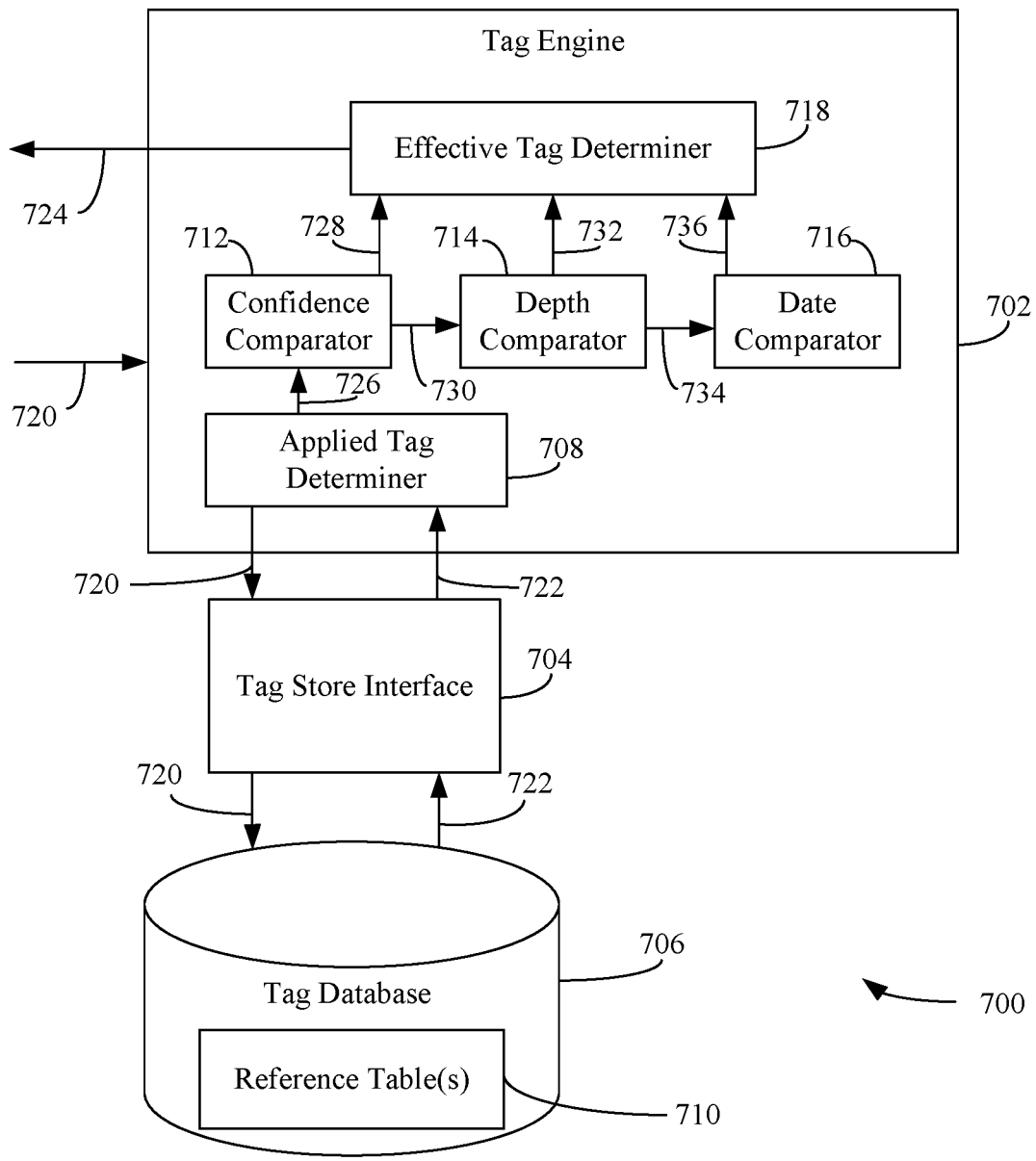
FIG. 7 shows a block diagram of a system for determining an effective tag for a data asset, according to an example embodiment.

Accordingly, an effective tag for a data asset may be determined in many ways. For example, FIG. 6 depicts a flowchart 600 for determining an effective tag for a data object in accordance with an example embodiment. Flowchart 600 is described with respect to FIG. 7 for illustrative purposes. FIG. 7 shows a block diagram of a system 700 for determining an effective tag for a data object in accordance with an example embodiment. As shown in FIG. 7, system 700 includes a tag engine 702, a tag store interface 704, and a tag database 706. Tag engine 702, tag store interface 704, and tag database 706 are examples of tag engine 502, tag store interface 504, and tag database 506, as respectively described above with reference to FIG. 5. As also shown in FIG. 7, tag engine 702 comprises an applied tag determiner 708, a confidence comparator 712, a depth comparator 714, a date comparator 716, and an effective tag determiner 718. As further shown in FIG. 7, tag database 706 comprises one or more reference tables 710. Reference table(s) 710 are an example of reference table(s) 510, as described above with reference to FIG. 5. Flowchart 600 and system 700 are described as follows.

Flowchart 600 begins with step 602. In step 602, a request for an effective tag associated with a data object stored in a hierarchy of data objects is received. The data objects include files and folders, and the data objects in the hierarchy has a plurality of associated applied tags. For instance, with reference to FIG. 7, tag engine 702 receives a request 720 for an effective tag associated with a data object stored in a hierarchy of data objects.

At step 604, applied tags associated with data objects in a path of the data object in the hierarchy are determined. For instance, with reference to FIG. 7, applied tag determiner 708 may send request 720 to tag store interface 704 for tags associated with the data object and data objects in the path of the data object in the hierarchy. Tag store interface 704 may send request 720 to tag database 706, and tag database 706 may send a response 722 that includes the tags to tag store interface 704. Tag store interface 704 may send response 722 to applied tag determiner 708, which determines the applied tags based on response 722.

In accordance with one or more embodiments, an applied tag of the determined applied tags is inherited from another data object in the path.

In accordance with one or more embodiments, the request includes a resource identifier of the data object that specifies the data object and the data objects in the path of the data object in the hierarchy (e.g. "Datacenter A/File Server A/Folder A/Folder A1/example_file.doc"). In accordance with such embodiments, the tags may be determined in accordance with flowchart 800, which is described below with reference to FIG. 8.

At step 606, the effective tag is determined based at least on attributes associated with the determined applied tags. For instance, with reference to FIG. 7, effective tag determiner 718 determines the effective tag based at least on attributes associated with the determined applied tags.

In accordance with one or more embodiments, the attributes associated with an applied tag comprises at least one of: a confidence level, an applied date at which the applied tag was associated with a corresponding data object, or a hierarchical depth of the associated data object in the hierarchy. Additional and/or alternative attributes may be present. Additional details regarding the effective tag determination is described below with reference to flowcharts 900, 1000, and 1100, as respectively described below with reference to FIGS. 9-11.

At step 608, the determined effective tag is provided subsequent to determining the effective tag. For instance, with reference to FIG. 7, a response 724 is provided by effective tag determiner 718 that specifies the determined effective tag.

Figure 8:
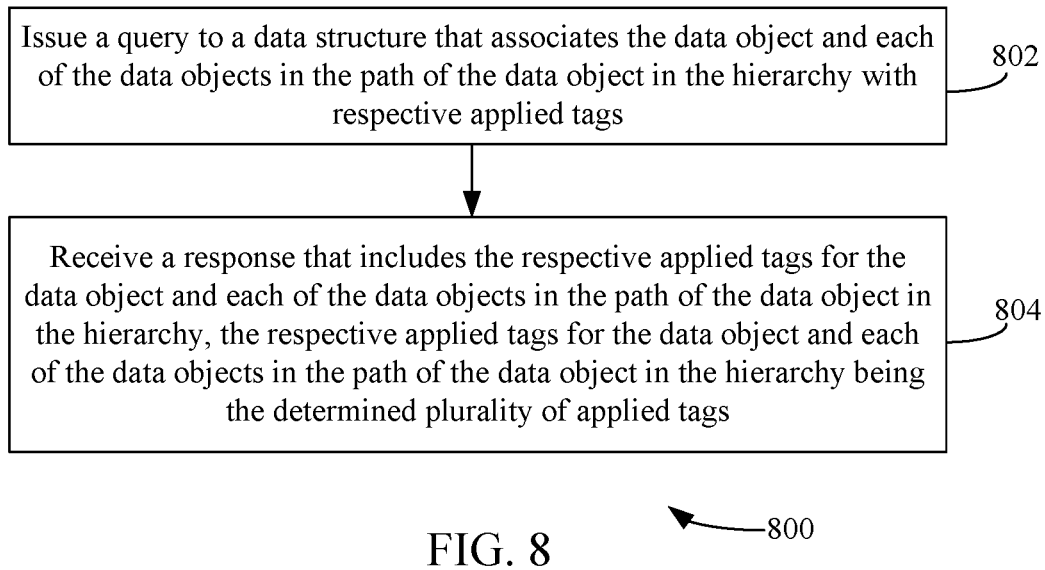
FIG. 8 depicts a flowchart for determining applied tags associated with data assets in a path of a data asset in a hierarchy, according to an example embodiment.

FIG. 8 depicts a flowchart 800 for determining applied tags associated with data objects in a path of a data object in a hierarchy in accordance with an embodiment. Step 604 may be performed in accordance with flowchart 800. Flowchart 800 is described with continued reference to FIG. 7 for illustrative purposes. Flowchart 800 and system 700 are described as follows.

Flowchart 800 begins with step 802. In step 802, a query is issued to a data structure that associates the data object and each of the data objects in the path of the data object in the hierarchy with respective applied tags. For instance, with reference to FIG. 7, request 720 is a query to reference table(s) 710. As described above, the query may specify a resource identifier of the data object that specifies the data object and the data objects in the path of the data object in the hierarchy (e.g. "Datacenter A/File Server A/Folder A/Folder A1/example_file.doc"). In accordance with an embodiment, tag engine 702 generates an index value for the data object and each data object in the path of the data object in the hierarchy and provides the index values to tag database 706 via request 720. Reference table(s) 710 may associate a respective index associated with the data object and each of the data objects in the path of the data object in the hierarchy with respective applied tags.

At step 804, a response that includes the respective applied tags for the data object and each of the data objects in the path of the data object in the hierarchy is received. The respective applied tags for the data object and each of the data objects in the path of the data object in the hierarchy are the plurality of applied tags determined in step 704 of flowchart 700. For example, with reference to FIG. 7, tag database 706 may determine the tags of the data object and each of the data objects in the path of the data object in the hierarchy based on the index values provided via request 720. For example, tag database 706 may search reference table(s) 710 for the applied tags based on the index values provided via request 720. Upon determining the tags, tag database 706 provides response 722 to applied tag determiner 708 of tag engine 702 via tag store interface 704. As described above, response 722 includes the determined applied tags.

Figure 9:
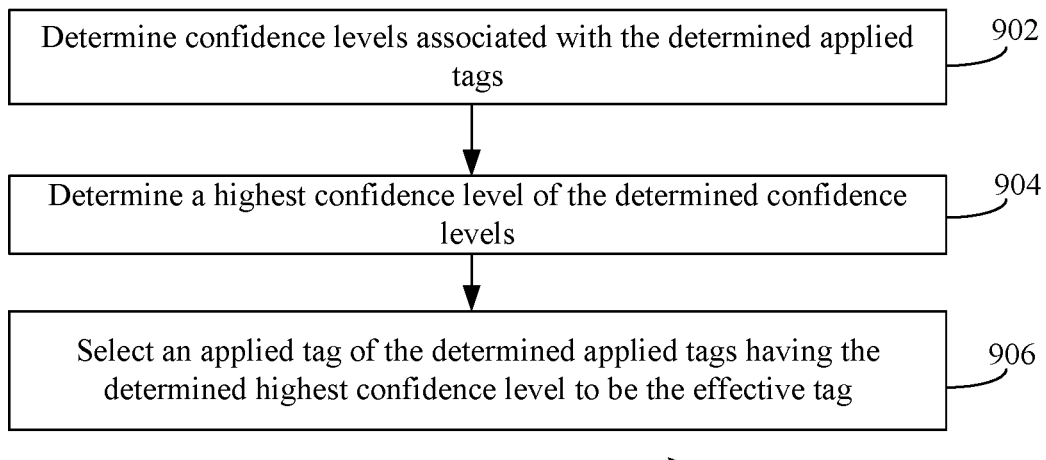
FIG. 9 depicts a flowchart for determining an effective tag for a data asset based on confidence level, according to an example embodiment.

FIG. 9 depicts a flowchart 900 for determining an effective tag for a data object in accordance with an example embodiment. Step 606 of flowchart 600 may be performed in accordance with flowchart 900. Flowchart 900 is described with continued reference to FIG. 7 for illustrative purposes. Flowchart 900 and system 700 are described as follows.

Flowchart 900 begins with step 902. In step 902, confidence levels associated with the determined applied tags are determined. For example, with reference to FIG. 7, applied tag determiner 708 may determine the confidence levels. For instance, reference table(s) 710 may also store attributes associated with each tag. The attributes may be provided to applied tag determiner 708 via response 722 (along with the determined applied tags). Applied tag determiner 708 may provide the determined confidence levels to confidence comparator 712 via a signal 726.

At step 904, a highest confidence level of the determined confidence levels is determined. For instance, with reference to FIG. 7, confidence comparator 712 may compare the confidence levels to determine the highest confidence level.

At step 906, an applied tag of the determined applied tags having the determined highest confidence level is selected to be the effective tag. For instance, confidence comparator 712 may output a signal 728 that specifies the tag having the highest confidence level. Effective tag determiner 718 receives signal 728 and determines the tag having the highest confidence level based on signal 728, which is the effective tag. As described above, effective tag determiner 718 outputs response 724, which specifies the determined effective tag.

Figure 10:
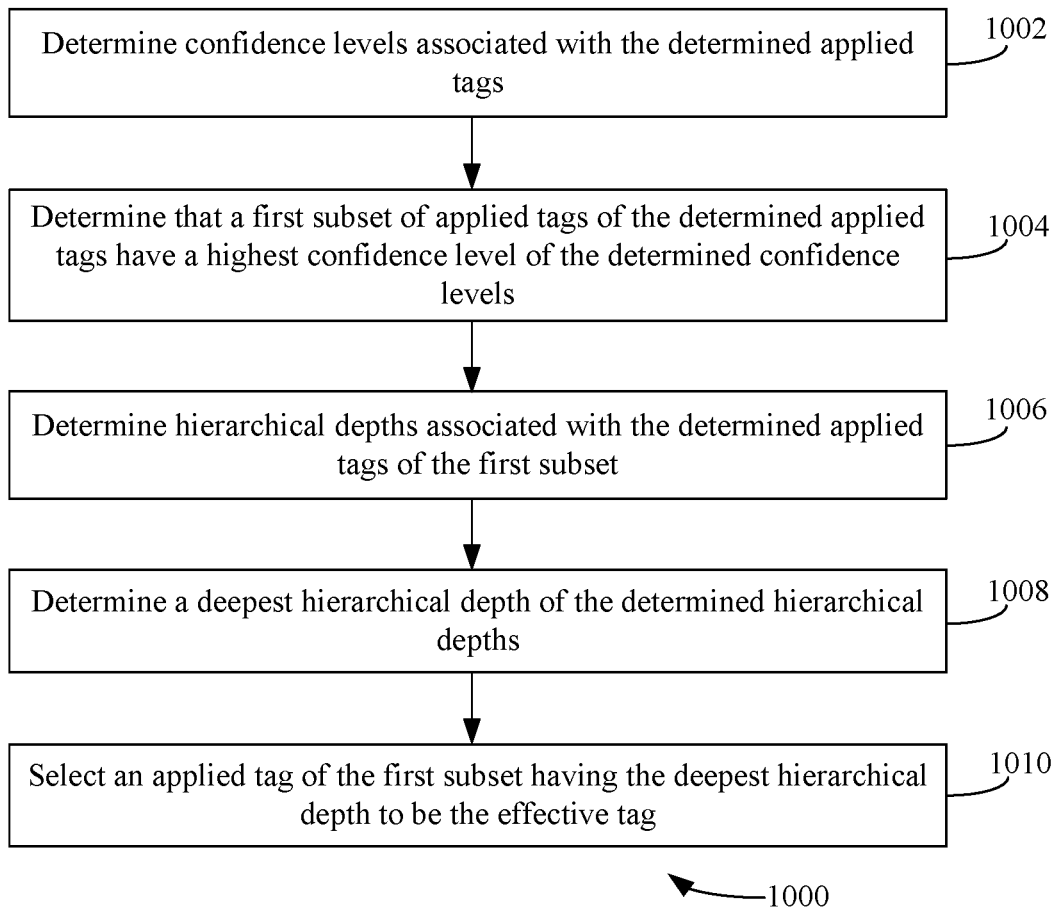
FIG. 10 depicts a flowchart for determining an effective tag for a data asset based on confidence level and hierarchical depth, according to another example embodiment.

FIG. 10 depicts a flowchart 1000 for determining an effective tag for a data object in accordance with another embodiment. Step 606 of flowchart 600 may be performed in accordance with flowchart 1000. Flowchart 1000 is described with continued reference to FIG. 7 for illustrative purposes. Flowchart 1000 and system 700 are described as follows.

Flowchart 1000 begins with step 1002. In step 1002, confidence levels associated with the determined applied tags are determined. For example, with reference to FIG. 7, applied tag determiner 708 may determine the confidence levels. For instance, reference table(s) 710 may also store attributes associated with each tag. The attributes may be provided to applied tag determiner 708 via response 722 (along with the determined applied tags). Applied tag determiner 708 may provide the determined confidence levels to confidence comparator 712 via signal 726.

At step 1004, a determination is made that a first subset of applied tags of the determined applied tags have a highest confidence level of the determined confidence levels. For instance, with reference to FIG. 7, confidence comparator 712 may compare the confidence levels and determine that a first subset of applied tags of the determined applied tags have a highest confidence level of the determined confidence levels (i.e., more than one tag has the same highest confidence level). In response to such a determination confidence comparator 712 may provide a signal 730 to depth comparator 714 that includes the hierarchical depth attributes associated with the first subset of applied tags of the determined applied tags.

At step 1006, hierarchical depths associated with the determined applied tags of the first subset are determined. For example, with reference to FIG. 7, depth comparator 714 may receive the hierarchical depth attributes via signal 730 and determine the hierarchical depths based thereon.

At step 1008, a deepest hierarchical depth of the determined hierarchical depths is determined. For example, with reference to FIG. 7, depth comparator 714 may compare the hierarchical depths associated with the first subset of applied tags and determine the deepest hierarchical depth.

At step 1010, an applied tag of the first subset having the determined deepest hierarchical depth is selected to be the effective tag. For instance, depth comparator 714 may output a signal 732 that specifies the tag having the deepest hierarchical depth. Effective tag determiner 718 receives signal 732 and determines the tag having the deepest hierarchical level based on signal 732, which is the effective tag. As described above, effective tag determiner 718 outputs response 724, which specifies the determined effective tag.

Figure 11:
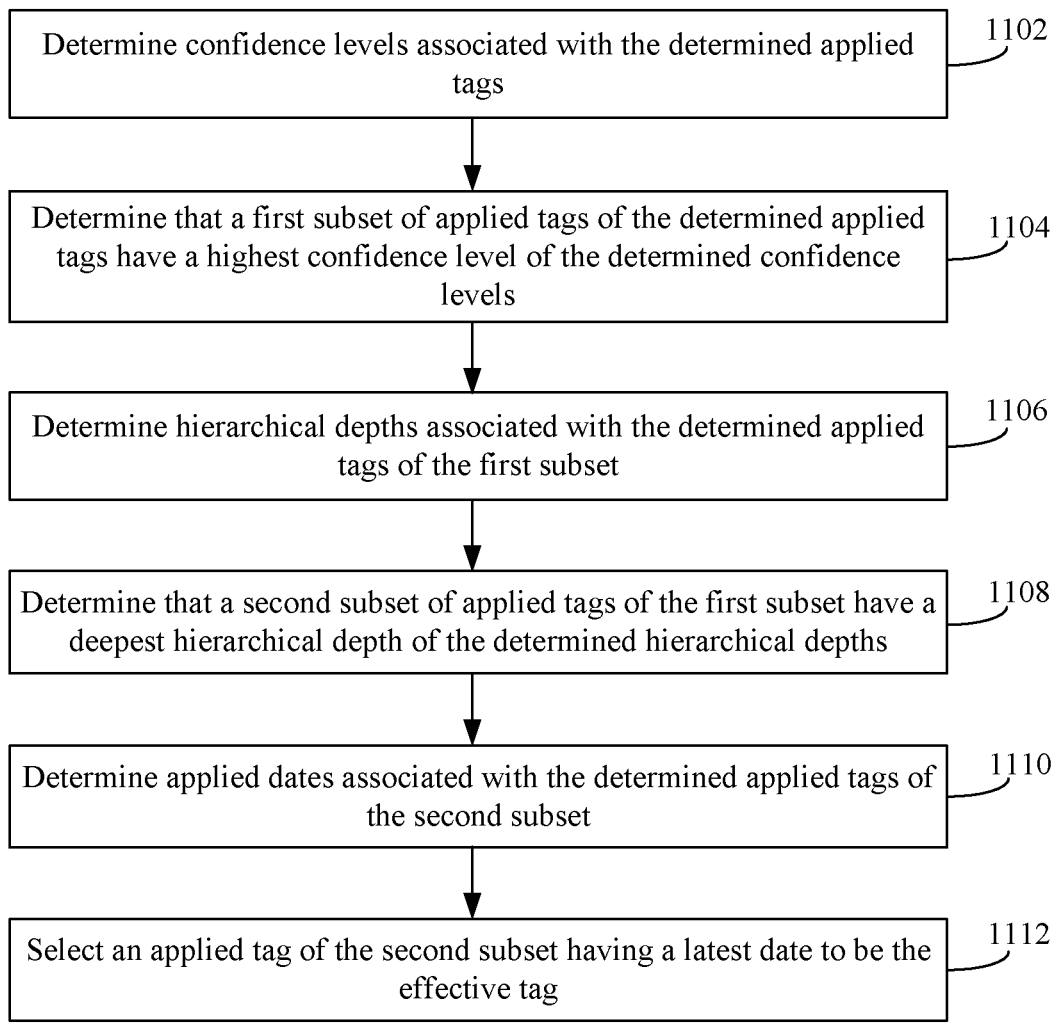
FIG. 11 depicts a flowchart for determining an effective tag for a data asset based on confidence level, hierarchical depth, and applied date, according to a further example embodiment.

FIG. 11 depicts a flowchart 1100 for determining an effective tag for a data object in accordance with a further embodiment. Step 606 of flowchart 600 may be performed in accordance with flowchart 1000. Flowchart 1100 is described with continued reference to FIG. 7 for illustrative purposes. Flowchart 1100 and system 700 are described as follows.

Flowchart 1100 begins with step 1102. In step 1102, confidence levels associated with the determined applied tags are determined. For example, with reference to FIG. 7, applied tag determiner 708 may determine the confidence levels. For instance, reference table(s) 710 may also store attributes associated with each tag. The attributes may be provided to applied tag determiner 708 via response 722 (along with the determined applied tags). Applied tag determiner 708 may provide the determined confidence levels to confidence comparator 712 via signal 726.

At step 1104, a determination is made that a first subset of applied tags of the determined applied tags have a highest confidence level of the determined confidence levels. For instance, with reference to FIG. 7, confidence comparator 712 may compare the confidence levels and determine that a first subset of applied tags of the determined applied tags have a highest confidence level of the determined confidence levels (i.e., more than one tag has the same highest confidence level). In response to such a determination confidence comparator 712 may provide a signal 730 to depth comparator 714 that includes the hierarchical depth attributes associated with the first subset of applied tags of the determined applied tags.

At step 1106, hierarchical depths associated with the determined applied tags of the first subset are determined. For example, with reference to FIG. 7, depth comparator 714 may receive the hierarchical depth attributes via signal 730 and determine the hierarchical depths based thereon.

At step 1108, a determination is made that a second subset of applied tags of the first subset have a deepest hierarchical depth of the determined hierarchical depths. For example, with reference to FIG. 7, depth comparator 714 may compare the hierarchical depths associated with the first subset of applied tags and determine a second subset of applied tags of the first subset have the same deepest hierarchical depth. That is, more than one tag in the second subset has the same highest confidence level and the same deepest hierarchical depth. In response to such a determination, depth comparator 714 may provide a signal 734 to data comparator 716 that includes the applied date attributes associated with the second subset of applied tags.

At step 1110, applied dates associated with the determined applied tags of the second subset are determined. For example, with reference to FIG. 7, date comparator 716 may receive the applied date attributes via signal 734 and determine the applied dates based thereon.

At step 1112, an applied tag of the second subset having a latest date is selected to be the effective tag. For instance, date comparator 716 may output a signal 736 that specifies the tag having the latest applied date. Effective tag determiner 718 receives signal 736 and determines the tag having the latest applied date based on signal 726, which is the effective tag. As described above, effective tag determiner 718 outputs response 724, which specifies the determined effective tag.

III. Additional Embodiments

It is noted that while the foregoing describes that an effective tag for a data asset may be determined, in certain embodiments a plurality of different effective tags may be determined for a data asset, where each effective tag is associated with a different category. For instance, a data asset may be classified in accordance with different categories. Different tags may be applied for each of the different categories. In accordance with such embodiments, reference table(s) (e.g., reference tables 400A and 400B) that associate a data asset with tags may associate tags (and attributes thereof) of different categories with each data asset. When the tag engine (e.g., tag engine 702) sends a request to retrieve the tags for a particular data asset, all the tags (and attributes therefor) for all the different categories are returned to the tag engine, and the tag engine determines the effective tag for each of the different categories.

As described above, the "Negate" tag affects the functionality of the tag engine. Specifically, the tag engine ignores all tags associated with the "Negate" tag when determining the effective tag. It is noted that other tags may also affect the functionality of the tag engine. For example, a user may apply a "Freeze Autotagging" tag to a particular data asset. When such a tag is applied, tags applied by automated tagging tool(s) (e.g., automated tagging tool(s) 116) are associated with a relatively low confidence level (e.g., 0.2), thereby effectively eliminating such tags from consideration during the effective tag determination.

In another example, a user may set permissions for tagging data assets via an authorization tag. For instance, a user may apply an authorization tag for a particular data asset that specifies which users can or cannot apply a tag. When a request to apply a tag to a data asset is received by the tag engine, the tag engine may retrieve the authorization tags that are associated with the data asset (if any). If the authorization tags indicate that the requesting user is authorized to apply a tag to the data object, the tag engine applies the tag to the data asset in accordance with techniques described herein. If the authorization tags indicate that the requesting user is not authorized to tag the data object, the tag engine may send a response indicating as such, and the tag engine does not apply the tag to the data object.

IV. Example Computer System Implementation

The systems and methods described above in reference to FIGS. 1-11, may be implemented in hardware, or hardware combined with one or both of software and/or firmware. For example, tag engine 114, tag database 108, tag engine 302, tag store interface 304, tag database 306, reference table(s) 310, reference table(s) 400A and 400B, tag engine 502, tag store interface 504, tag database 506, reference table(s) 510, tag engine 702, tag store interface 704, tag database 706, reference table(s) 710, applied tag determiner 708, confidence comparator 712, depth comparator 714, date comparator 716, effective tag determiner 718, flowchart 600, flowchart 800, flowchart 900, flowchart 1000, and/or flowchart 1100 may be each implemented as computer program code/instructions configured to be executed in one or more processors and stored in a computer readable storage medium. Alternatively, tag engine 114, tag database 108, tag engine 302, tag store interface 304, tag database 306, reference table(s) 310, reference table(s) 400A and 400B, tag engine 502, tag store interface 504, tag database 506, reference table(s) 510, tag engine 702, tag store interface 704, tag database 706, reference table(s) 710, applied tag determiner 708, confidence comparator 712, depth comparator 714, date comparator 716, effective tag determiner 718, flowchart 600, flowchart 800, flowchart 900, flowchart 1000, and/or flowchart 1100 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 12:
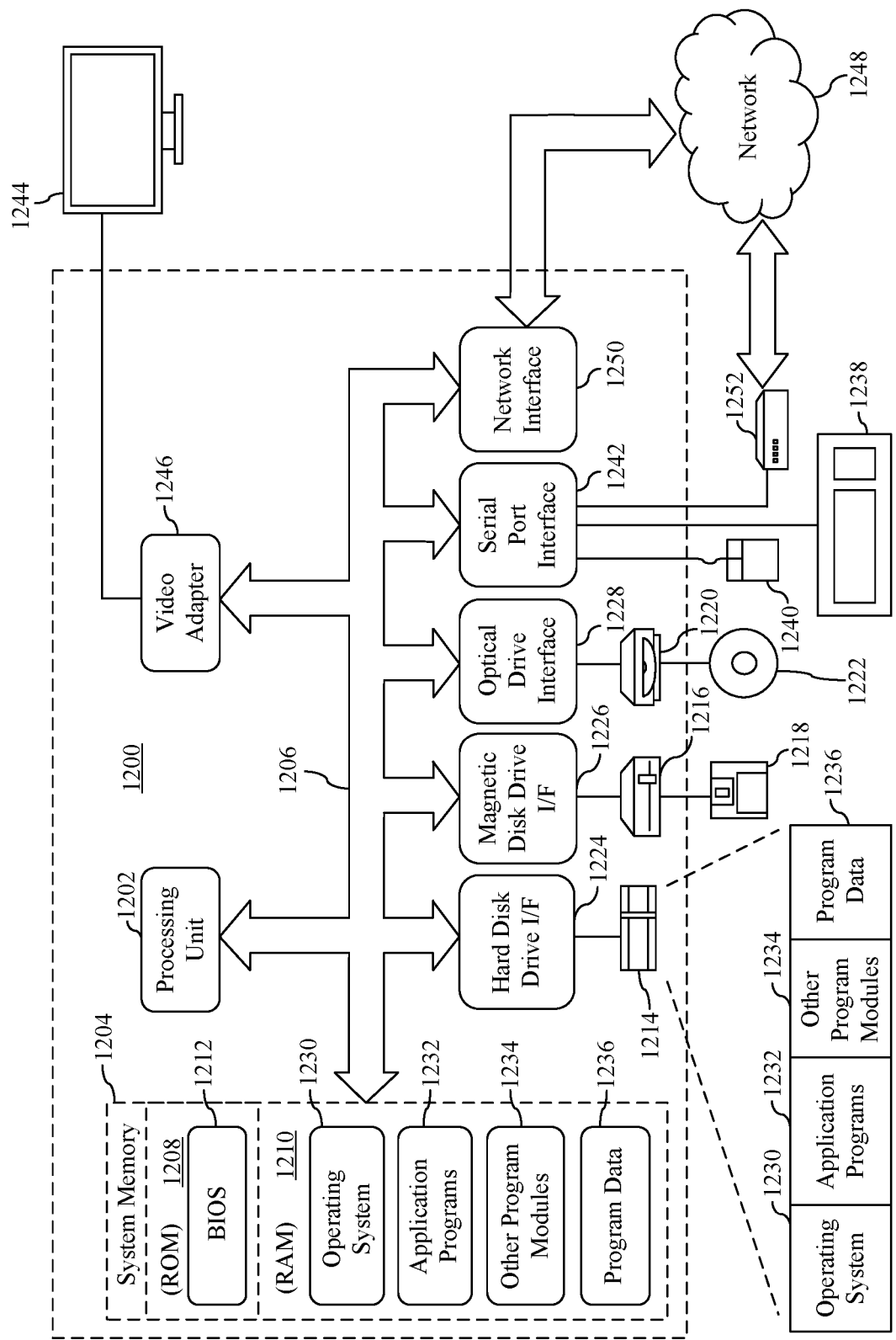
FIG. 12 is a block diagram of an example computing device that may be used to implement embodiments.

Furthermore, FIG. 12 depicts an exemplary implementation of a computing device 1200 in which embodiments may be implemented, including server(s) 102, server(s) 104, tag engine 114, tag database 108, tag engine 302, tag store interface 304, tag database 306, reference table(s) 310, reference table(s) 400A and 400B, tag engine 502, tag store interface 504, tag database 506, reference table(s) 510, tag engine 702, tag store interface 704, tag database 706, reference table(s) 710, applied tag determiner 708, confidence comparator 712, depth comparator 714, date comparator 716, effective tag determiner 718, and/or each of the components described therein, and flowchart 600, flowchart 800, flowchart 900, flowchart 1000, and/or flowchart 1100.

The description of computing device 1200 provided herein is provided for purposes of illustration, and is not intended to be limiting. Embodiments may be implemented in further types of computer systems, as would be known to persons skilled in the relevant art(s).

As shown in FIG. 12, computing device 1200 includes one or more processors, referred to as processor circuit 1202, a system memory 1204, and a bus 1206 that couples various system components including system memory 1204 to processor circuit 1202. Processor circuit 1202 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1202 may execute program code stored in a computer readable medium, such as program code of operating system 1230, application programs 1232, other programs 1234, etc. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computing device 1200 also has one or more of the following drives: a disk drive 1214 for reading from and writing to a hard disk or a solid state drive, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1230, one or more application programs 1232, other programs 1234, and program data 1236. Application programs 1232 or other programs 1234 may include, for example, computer program logic (e.g., computer program code or instructions) for implementing the systems described above, including the effective tag determination techniques described in reference to FIGS. 1-11.

A user may enter commands and information into the computing device 1200 through input devices such as keyboard 1238 and pointing device 1240. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1202 through a serial port interface 1242 that is coupled to bus 1206, but may be connected by other interfaces, such as a parallel port, game port, or a universal serial bus (USB).

A display screen 1244 is also connected to bus 1206 via an interface, such as a video adapter 1246. Display screen 1244 may be external to, or incorporated in computing device 1200. Display screen 1244 may display information, as well as being a user interface for receiving user commands and/or other information (e.g., by touch, finger gestures, virtual keyboard, etc.). In addition to display screen 1244, computing device 1200 may include other peripheral output devices (not shown) such as speakers and printers.

Computing device 1200 is connected to a network 1248 (e.g., the Internet) through an adaptor or network interface 1250, a modem 1252, or other means for establishing communications over the network. Modem 1252, which may be internal or external, may be connected to bus 1206 via serial port interface 1242, as shown in FIG. 12, or may be connected to bus 1206 using another interface type, including a parallel interface.

As used herein, the terms "computer program medium," "computer-readable medium," and "computer-readable storage medium" are used to generally refer to physical hardware media such as the hard disk associated with hard disk drive 1214, removable magnetic disk 1218, removable optical disk 1222, other physical hardware media such as RAMs, ROMs, flash memory cards, digital video disks, zip disks, MEMs, nanotechnology-based storage devices, and further types of physical/tangible hardware storage media (including system memory 1204 of FIG. 12). Such computer-readable storage media are distinguished from and non-overlapping with communication media (do not include communication media or modulated data signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1232 and other programs 1234) may be stored on the hard disk, magnetic disk, optical disk, ROM, RAM, or other hardware storage medium. Such computer programs may also be received via network interface 1250, serial port interface 1242, or any other interface type. Such computer programs, when executed or loaded by an application, enable computing device 1200 to implement features of embodiments discussed herein. Accordingly, such computer programs represent controllers of the computing device 1200.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

Embodiments described herein may also be implemented and/or executed via virtual or emulated hardware (e.g., virtual machines) and/or other environments, including, but not limited to, a cloud-computing based environment (e.g., Microsoft Azure by Microsoft Corporation C)).

V. Additional Exemplary Embodiments

A method is described herein. The method includes: receiving a request for an effective tag associated with a data object stored in a hierarchy of data objects, the data objects including files and folders, the data objects in the hierarchy having a plurality of associated applied tags; determining applied tags associated with data objects in a path of the data object in the hierarchy; determining the effective tag based at least on attributes associated with the determined applied tags; and providing the determined effective tag subsequent to determining the effective tag.

In one embodiment of the foregoing method, an applied tag of the determined applied tags is inherited from another data object in the path.

In another embodiment of the foregoing method, the attributes associated with an applied tag comprise at least one of: a confidence level; an applied date at which the applied tag was associated with a corresponding data object; or a hierarchical depth of the associated data object in the hierarchy.

In a further embodiment of the foregoing method, said determining the effective tag based on attributes associated with the determined applied tags comprises: determining confidence levels associated with the determined applied tags; determining a highest confidence level of the determined confidence levels; and selecting an applied tag of the determined applied tags having the determined highest confidence level to be the effective tag.

In yet another embodiment of the foregoing method, said determining the effective tag based on attributes associated with the determined applied tags further comprises: determining confidence levels associated with the determined applied tags; determining that a first subset of applied tags of the determined applied tags have a highest confidence level of the determined confidence levels; determining hierarchical depths associated with the determined applied tags of the first subset; determining a deepest hierarchical depth of the determined hierarchical depths; and selecting an applied tag of the first subset having the deepest hierarchical depth to be the effective tag.

In still another embodiment of the foregoing method, said determining the effective tag based on attributes associated with the determined applied tags further comprises: determining confidence levels associated with the determined applied tags; determining that a first subset of applied tags of the determined applied tags have a highest confidence level of the determined confidence levels; determining hierarchical depths associated with the determined applied tags of the first subset; determining that a second subset of applied tags of the first subset have a deepest hierarchical depth of the determined hierarchical depths; determining applied dates associated with the determined applied tags of the second subset; and selecting an applied tag of the second subset having a latest date to be the effective tag.

In another embodiment of the foregoing method, the request includes a resource identifier of the data object that specifies the data object and the data objects in the path of the data object in the hierarchy; wherein said determining applied tags associated with data objects in a path of the data object in the hierarchy comprises: issuing a query to a data structure that associates the data object and each of the data objects in the path of the data object in the hierarchy with respective applied tags; and receiving a response that includes the respective applied tags for the data object and each of the data objects in the path of the data object in the hierarchy, the respective applied tags for the data object and each of the data objects in the path of the data object in the hierarchy being the determined plurality of applied tags.

A system is also described herein. The system comprises: at least one processor circuit; and at least one memory that stores program code configured to be executed by the at least one processor circuit. The program code comprises: a tag engine configured to receive a request for an effective tag associated with a data object stored in a hierarchy of data objects, the data objects including files and folders, the data objects in the hierarchy having a plurality of associated applied tags; an applied tag determiner configured to determine applied tags associated with data objects in a path of the data object in the hierarchy; and an effective tag determiner configured to determine the effective tag based at least on attributes associated with the determined applied tags, the tag engine further configured to provide the determined effective tag subsequent to determining the effective tag.

In one embodiment of the system, an applied tag of the determined applied tags is inherited from another data object in the path.

In another embodiment of the system, the attributes associated with an applied tag comprise at least one of: a confidence level; an applied date at which the applied tag was associated with a corresponding data object; or a hierarchical depth of the associated data object in the hierarchy.

In yet another embodiment of the system, the applied tag determiner is configured to determine confidence levels associated with the determined applied tags, the tag engine comprising: a confidence comparator configured to: determine a highest confidence level of the determined confidence levels; and select an applied tag of the determined applied tags having the determined highest confidence level to be the effective tag.

In still another embodiment of the system, the applied tag determiner is configured to determine confidence levels associated with the determined applied tags, the tag engine comprising: a confidence comparator configured to: determine confidence levels associated with the determined applied tags; and determine that a first subset of applied tags of the determined applied tags have a highest confidence level of the determined confidence levels; and a depth comparator configured to: determine hierarchical depths associated with the determined applied tags of the first subset; determine a deepest hierarchical depth of the determined hierarchical depths; and select an applied tag of the first subset having the deepest hierarchical depth to be the effective tag In another embodiment of the system, the applied tag determiner is configured to determine confidence levels associated with the determined applied tags, the tag engine comprising: a confidence comparator configured to: determine confidence levels associated with the determined applied tags; and determine that a first subset of applied tags of the determined applied tags have a highest confidence level of the determined confidence levels; a depth comparator configured to: determine hierarchical depths associated with the determined applied tags of the first subset; and determine that a second subset of applied tags of the first subset have a deepest hierarchical depth of the determined hierarchical depths; and a date comparator configured to: determine applied dates associated with the determined applied tags of the second subset; and select an applied tag of the second subset having a latest date to be the effective tag.

In still another embodiment of the system, the request includes a resource identifier of the data object that specifies the data object and the data objects in the path of the data object in the hierarchy, and wherein the applied tag determiner is configured to: issue a query to a data structure that associates the data object and each of the data objects in the path of the data object in the hierarchy with respective applied tags; and receive a response that includes the respective applied tags for the data object and each of the data objects in the path of the data object in the hierarchy, the respective applied tags for the data object and each of the data objects in the path of the data object in the hierarchy being the determined plurality of applied tags.

A computer-readable storage medium having program instructions recorded thereon that, when executed by at least one processor, perform a method is further described herein. The method comprises: receiving a request for an effective tag associated with a data object stored in a hierarchy of data objects, the data objects including files and folders, the data objects in the hierarchy having a plurality of associated applied tags; determining applied tags associated with data objects in a path of the data object in the hierarchy; determining the effective tag based at least on attributes associated with the determined applied tags; and providing the determined effective tag subsequent to determining the effective tag.

In one embodiment of the foregoing computer-readable storage medium, an applied tag of the determined applied tags is inherited from another data object in the path.

In another embodiment of the foregoing computer-readable storage medium, the attributes associated with an applied tag comprise at least one of: a confidence level; an applied date at which the applied tag was associated with a corresponding data object; or a hierarchical depth of the associated data object in the hierarchy.

In a further embodiment of the foregoing computer-readable storage medium, said determining the effective tag based on attributes associated with the determined applied tags comprises: determining confidence levels associated with the determined applied tags; determining a highest confidence level of the determined confidence levels; and selecting an applied tag of the determined applied tags having the determined highest confidence level to be the effective tag.

In yet another embodiment of the foregoing computer-readable storage medium, said determining the effective tag based on attributes associated with the determined applied tags further comprises: determining confidence levels associated with the determined applied tags; determining that a first subset of applied tags of the determined applied tags have a highest confidence level of the determined confidence levels; determining hierarchical depths associated with the determined applied tags of the first subset; determining a deepest hierarchical depth of the determined hierarchical depths; and selecting an applied tag of the first subset having the deepest hierarchical depth to be the effective tag.

In still another embodiment of the foregoing computer-readable storage medium, said determining the effective tag based on attributes associated with the determined applied tags further comprises: determining confidence levels associated with the determined applied tags; determining that a first subset of applied tags of the determined applied tags have a highest confidence level of the determined confidence levels; determining hierarchical depths associated with the determined applied tags of the first subset; determining that a second subset of applied tags of the first subset have a deepest hierarchical depth of the determined hierarchical depths; determining applied dates associated with the determined applied tags of the second subset; and selecting an applied tag of the second subset having a latest date to be the effective tag.

VI. Conclusion

While various embodiments have been described above, it should be understood that they have been presented by way of example only, and not limitation. It will be understood by those skilled in the relevant art(s) that various changes in form and details may be made therein without departing from the spirit and scope of the disclosed embodiments as defined in the appended claims. Accordingly, the breadth and scope of the present embodiments should not be limited by any of the above-described exemplary embodiments, but should be defined only in accordance with the following claims and their equivalents.

What is claimed is:

1. A method, comprising:
receiving, by a server, a user-initiated request for an effective tag associated with a data object stored in a hierarchy of data objects, the data objects including files and folders, the data objects in the hierarchy having a plurality of associated applied tags, the user-initiated request including a resource identifier that specifies the data object and a subset of the data objects in the hierarchy that are in a hierarchical path of the data object;
responsive to receiving the user-initiated request for the effective tag associated with the data object:
issuing, by the server, a query to a data structure that associates the data object and each of the subset of the data objects in the hierarchical path of the data object with respective applied tags of the plurality of associated applied tags; and
receiving, by the server, a response that includes the respective applied tags for the data object and each of the subset of the data objects in the hierarchical path of the data object;
determining, by the server, confidence levels associated with the respective applied tags;
determining, by the server, that a first subset of applied tags of the respective applied tags has a highest confidence level of the determined confidence levels;
determining, by the server, hierarchical depths associated with the respective applied tags of the first subset;
determining, by the server, that a second subset of applied tags of the first subset has a deepest hierarchical depth of the determined hierarchical depths;
determining, by the server, applied dates associated with the respective applied tags of the second subset;
selecting, by the server, an applied tag of the second subset having a latest date to be the effective tag; and
providing, by the server, the effective tag.

2. The method of claim 1, wherein an applied tag of the respective applied tags is inherited from another data object in the path.

3. The method of claim 1, wherein the data structure is a reference table.

4. The method of claim 1, wherein each respective applied tag of the respective applied tags is associated with at least one attribute.

5. The method of claim 4, wherein the at least attribute comprises at least one of:
a respective confidence level of the confidence levels;
a respective applied date of the applied dates at which the respective applied tag was associated with a corresponding data object; or
a respective hierarchical depth, of the hierarchical depths, of the associated data object in the hierarchy.

6. The method of claim 4, wherein the data objects in the hierarchy are associated with the plurality of associated applied tags by an automatic tagging tool.

7. The method of claim 6, wherein the at least one attribute comprises a name of the automatic tagging tool.

8. A server, comprising:
at least one processor; and
at least one memory that stores program code, that when executed by the at least one processor, performs a method, the method comprising:
receiving, by the server, a user-initiated request for an effective tag associated with a data object stored in a hierarchy of data objects, the data objects including files and folders, the data objects in the hierarchy having a plurality of associated applied tags, the user-initiated request including a resource identifier that specifies the data object and a subset of the data objects in the hierarchy that are in a hierarchical path of the data object;
responsive to receiving the user-initiated request for the effective tag associated with the data object:
issuing, by the server, a query to a data structure that associates the data object and each of the subset of the data objects in the hierarchical path of the data object with respective applied tags of the plurality of associated applied tags; and
receiving, by the server, a response that includes the respective applied tags for the data object and each of the subset of the data objects in the hierarchical path of the data object;
determining, by the server, confidence levels associated with the respective applied tags;
determining, by the server, that a first subset of applied tags of the respective applied tags has a highest confidence level of the determined confidence levels;
determining, by the server, hierarchical depths associated with the respective applied tags of the first subset;
determining, by the server, that a second subset of applied tags of the first subset has a deepest hierarchical depth of the determined hierarchical depths;
determining, by the server, applied dates associated with the respective applied tags of the second subset;
selecting, by the server, an applied tag of the second subset having a latest date to be the effective tag; and
providing, by the server, the effective tag.

9. The server of claim 8, wherein an applied tag of the respective applied tags is inherited from another data object in the path.

10. The server of claim 8, wherein the data structure is a reference table.

11. The server of claim 8, wherein each respective applied tag of the respective applied tags is associated with at least one attribute.

12. The server of claim 11, wherein the at least attribute comprises at least one of:
a respective confidence level of the confidence levels;
a respective applied date of the applied dates at which the respective applied tag was associated with a corresponding data object; or
a respective hierarchical depth, of the hierarchical depths, of the associated data object in the hierarchy.

13. The server of claim 11, wherein the data objects in the hierarchy are associated with the plurality of associated applied tags by an automatic tagging tool.

14. The server of claim 13, wherein the at least one attribute comprises a name of the automatic tagging tool.

15. A computer-readable storage medium having program instructions recorded thereon that, when executed by at least one processor, perform a method, the method comprising:
receiving, by a server, a user-initiated request for an effective tag associated with a data object stored in a hierarchy of data objects, the data objects including files and folders, the data objects in the hierarchy having a plurality of associated applied tags, the user-initiated request including a resource identifier that specifies the data object and a subset of the data objects in the hierarchy that are in a hierarchical path of the data object;
responsive to receiving the user-initiated request for the effective tag associated with the data object:
issuing, by the server, a query to a data structure that associates the data object and each of the subset of the data objects in the hierarchical path of the data object with respective applied tags of the plurality of associated applied tags; and
receiving, by the server, a response that includes the respective applied tags for the data object and each of the subset of the data objects in the hierarchical path of the data object;
determining, by the server, confidence levels associated with the respective applied tags;
determining, by the server, that a first subset of applied tags of the respective applied tags has a highest confidence level of the determined confidence levels;
determining, by the server, hierarchical depths associated with the respective applied tags of the first subset;
determining, by the server, that a second subset of applied tags of the first subset has a deepest hierarchical depth of the determined hierarchical depths;
determining, by the server, applied dates associated with the respective applied tags of the second subset;
selecting, by the server, an applied tag of the second subset having a latest date to be the effective tag; and
providing, by the server, the effective tag.

16. The computer-readable storage medium of claim 15, wherein an applied tag of the respective applied tags is inherited from another data object in the path.

17. The computer-readable storage medium of claim 15, wherein the data structure is a reference table.

18. The computer-readable storage medium of claim 15, wherein each respective applied tag of the respective applied tags is associated with at least one attribute.

19. The computer-readable storage medium of claim 18, wherein the at least attribute comprises at least one of:
a respective confidence level of the confidence levels;
a respective applied date of the applied dates at which the respective applied tag was associated with a corresponding data object; or
a respective hierarchical depth, of the hierarchical depths, of the associated data object in the hierarchy.

20. The computer-readable storage medium of claim 18, wherein the data objects in the hierarchy are associated with the plurality of associated applied tags by an automatic tagging tool.

* * * * *